United States Patent
Akimoto (10) Patent No.: US 12,296,514 B2
(45) Date of Patent: May 13, 2025

(54) MOLDED BODY AND PRODUCTION METHOD THEREOF

(71) Applicant: DENSO CORPORATION, Kariya (JP)

(72) Inventor: Rentarou Akimoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 161 days.

(21) Appl. No.: 17/663,468

(22) Filed: May 16, 2022

(65) Prior Publication Data
US 2022/0266486 A1  Aug. 25, 2022

Related U.S. Application Data

(63) Continuation of application No. PCT/JP2020/041742, filed on Nov. 9, 2020.

(30) Foreign Application Priority Data

Nov. 18, 2019 (JP) ................. 2019-208127

(51) Int. Cl.
B29C 45/00 (2006.01)
B29C 45/16 (2006.01)
B29C 45/27 (2006.01)

(52) U.S. Cl.
CPC ...... B29C 45/0025 (2013.01); B29C 45/1615 (2013.01); B29C 45/2708 (2013.01); *B29C 2045/0027* (2013.01); *B29K 2995/0026* (2013.01)

(58) Field of Classification Search
CPC ............ B29C 45/0025; B29C 45/1615; B29C 45/2708; B29C 2045/0027; B29K 2995/0026
See application file for complete search history.

(56) References Cited

U.S. PATENT DOCUMENTS

| | | |
|---|---|---|
| 2002/0005773 A1 | 1/2002 | Uchiyama |
| 2012/0280536 A1 | 11/2012 | Malek et al. |
| 2012/0323078 A1* | 12/2012 | Kikumori ........... B29C 45/0025 600/176 |
| 2013/0100690 A1 | 4/2013 | Dereani et al. |

FOREIGN PATENT DOCUMENTS

| | | | |
|---|---|---|---|
| DE | 36 07 410 A1 | 9/1987 | |
| DE | 10 2007 052 197 A1 | 4/2009 | |
| JP | h08276468 A * | 10/1996 | ......... B29C 45/1704 |
| JP | 2014-195921 A | 10/2014 | |
| JP | 2021-079602 A | 5/2021 | |
| JP | 2021-079603 A | 5/2021 | |

OTHER PUBLICATIONS

Machine Translation of JPH08276468A. (Year: 1996).*
U.S. Appl. No. 17/663,472 and its entire file history, filed May 16, 2022, Akimoto.

* cited by examiner

*Primary Examiner* — Brian Handville
(74) *Attorney, Agent, or Firm* — Maschoff Brennan

(57) ABSTRACT

A molded body according to one aspect of the present disclosure is a molded body obtained by molding resin and used by allowing light to pass through the resin. In this molded body, a gate mark as a mark of a gate through which resin was injected during molding is disposed to a bonding surface to be bonded to an other member having no light transmittance, that is, to a bonding surface in the molded body.

6 Claims, 7 Drawing Sheets

MOLDED BODY AND PRODUCTION METHOD THEREOF

CROSS-REFERENCE TO RELATED APPLICATION

This application is the U.S. bypass application of International Application No. PCT/JP2020/041742 filed on Nov. 9, 2020 which designated the U.S. and claims priority to Japanese Patent Application No. 2019-208127 filed on Nov. 18, 2019 the contents of both of which are incorporated herein by reference.

TECHNICAL FIELD

The present disclosure relates to a molded body obtained by molding resin and a production method of the molded body.

BACKGROUND

A molded body has been proposed which is obtained by injecting molten resin into a mold through a gate thereby to mold (for example, injection mold) the resin into a shape corresponding to the space of the mold. Also, for example, as indicated in JP 2014-195921 A, it has been proposed to cut a gate mark constituted by resin solidified at a gate of a mold and polish the cut surface.

SUMMARY

A molded body according to one aspect of the present disclosure is a molded body obtained by molding resin and used by allowing light to pass through the resin, and includes a gate mark and a bonding surface. The gate mark is a mark of a gate through which the resin was injected during the molding. The gate mark is disposed on the bonding surface in the molded body to be bonded to an other member having no light transmittance.

A production method of the molded body according to another aspect of the present disclosure is a production method of the molded body which includes injecting resin into a mold through a gate to produce a molded body. In the production method, the gate is disposed in a position corresponding to a bonding surface that is a surface of the molded body to be bonded to an other member having no light transmittance.

A production method of the molded body according to further another aspect of the present disclosure includes a first process and a second process. The first process is a process of injecting a first resin through a first gate into a first mold to produce a first molded body having light transmittance. The second process is a process of placing the first molded body in a second mold, which is different from the first mold, and injecting a second resin into the second mold through a second gate, which is different from the first gate. Also, this second process is a process of producing a second molded body having no light transmittance using the second resin such that the second resin is bonded to the mark of the first gate in the first molded body.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

As a result of detailed research by the inventor, it was found that, like a lens indicated in JP 2014-195921 A, a molded body (for example, an optical component) used by allowing light to pass through a resin constituting the molded body has the below-described problem unless a gate mark is appropriately treated.

In the molded body used by allowing light to pass through a resin constituting the molded body, a light passing through the resin is partly reflected on the inner circumferential surface or the outer circumferential surface of the molded body toward the inside of the molded body. A portion of the light attempting to pass through the resin sometimes propagates in the molded body in response to multiple reflections within the molded body. When the light reaches a gate mark which is not completely smoothed, it may be reflected by the gate mark in an unexpected direction and emerge from the molded body, which deteriorates the optical properties of the molded body as an optical component or the like. Also, polishing the gate mark so as to be completely smoothed increases the production cost and is thus inappropriate.

One aspect of the present disclosure is a molded body obtained by molding resin and used by allowing light to pass through the resin. Also, it is desirable to provide a technology that can suppress reduction in optical properties of the molded body without completely smoothing the gate mark.

A molded body according to one aspect of the present disclosure is a molded body obtained by molding resin and used by allowing light to pass through the resin, and includes a gate mark and a bonding surface. The gate mark is a mark of a gate through which the resin was injected during the molding. The gate mark is disposed on the bonding surface in the molded body to be bonded to an other member having no light transmittance.

According to such a configuration, a gate mark is disposed on the bonding surface to be bonded to the other member having no light transmittance. Therefore, the gate mark can be prevented from influencing the light passing through the molded body, even when the gate mark is not completely smoothed. That is, even when the light propagating in the molded body reaches a gate mark which is not completely smoothed, the gate mark is bonded to the other member. Consequently, the light reflected by the gate mark is sometimes blocked by this other member even if it would otherwise emerge from the molded body. Therefore, even when the gate mark is not completely smoothed, reduction in optical properties of the molded body can be suppressed.

A production method of the molded body according to another aspect of the present disclosure is a production method of the molded body which includes injecting resin into a mold through a gate to produce a molded body. In the production method, the gate is disposed in a position corresponding to a bonding surface that is a surface of the molded body to be bonded to an other member having no light transmittance.

The molded body produced by such a production method includes a gate mark on a bonding surface to be bonded to the other member having no light transmittance. Consequently, the gate mark can be prevented from influencing the light passing through the molded body, even when the gate mark in the molded body is not completely smoothed.

That is, even when the light propagating in the molded body reaches a gate mark which is not completely smoothed, the gate mark is bonded to the other member. Consequently, the light reflected by the gate mark is sometimes blocked by this other member even if it would otherwise emerge from the molded body. Therefore, even when the gate mark is not completely smoothed, reduction in optical properties of the molded body can be suppressed.

A production method of the molded body according to further another aspect of the present disclosure includes a first process and a second process. The first process is a process of injecting a first resin through a first gate into a first mold to produce a first molded body having light transmittance. The second process is a process of placing the first molded body in a second mold, which is different from the first mold, and injecting a second resin into the second mold through a second gate, which is different from the first gate. Also, this second process is a process of producing a second molded body having no light transmittance using the second resin such that the second resin is bonded to the mark of the first gate in the first molded body.

The molded body produced by such a production method includes the mark of the first gate (hereinafter, a first gate mark) in the first process, on a bonding surface to be bonded to the second molded body having no light transmittance, in the first molded body having light transmittance. Consequently, the first gate mark can be prevented from influencing the light passing through the first molded body, even when the first gate mark in the first molded body is not completely smoothed.

That is, even when the light propagating in the first molded body reaches the first gate mark which is not completely smoothed, the first gate mark is bonded to the second molded body having no light transmittance. Consequently, the light reflected by the first gate mark is sometimes blocked by the second molded body even if it would otherwise emerge from the molded body. Therefore, even when the first gate mark in the first molded body is not completely smoothed, reduction in optical properties of the first molded body can be suppressed.

Also, in the second process, a second molded body is produced by injecting a second resin into a mold such that the second resin is bonded to the first gate mark in the first molded body. This sometimes causes the first gate mark to melt and disappear during molding of the second molded body, which can further favorably suppress the reduction in optical properties of the first molded body. Also, even when the first gate mark does not melt during molding of a second molded body, the surroundings of the first gate mark can be favorably hidden by a resin constituting the second molded body, which can favorably suppress the reduction in optical properties of the second molded body.

Hereinafter, illustrative embodiments for carrying out the present disclosure will be described with reference to the drawings.

1. First Embodiment 1-1. Configuration

Figure 1:
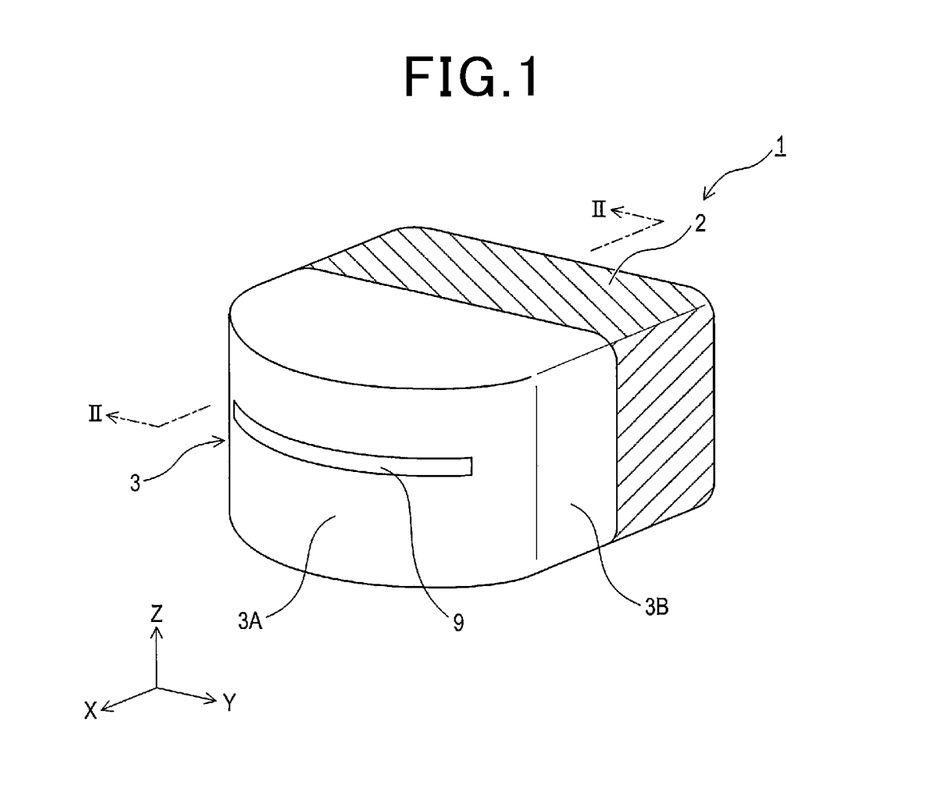
FIG. 1 is a perspective view illustrating a configuration of a radar apparatus according to a first embodiment.
Figure 2:
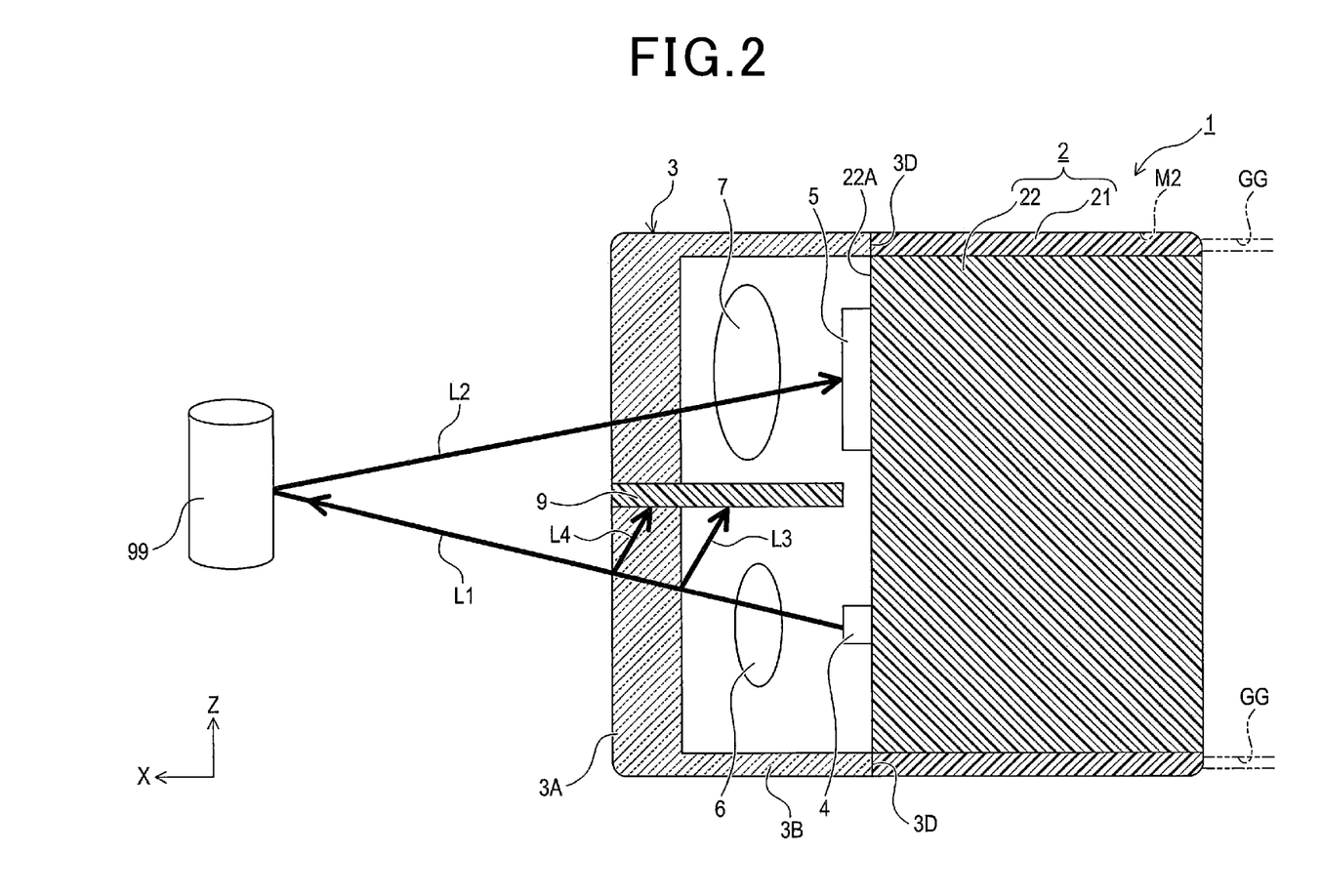
FIG. 2 is an illustrative view schematically indicating an internal configuration of the radar apparatus according to the first embodiment, taken along the II-II cross section line in FIG. 1.

As illustrated in FIG. 1, a radar apparatus 1 according to an embodiment includes a body part 2 and a cover part 3. The body part 2 is constituted in a rectangular parallelepiped shape by a resin having substantially no light transmittance. More specifically, as illustrated in FIG. 2, the body part 2 includes a cover retaining member 21 having a tubular shape with a rectangular cross section (that is, a rectangular tube shape) and a detection part retaining member 22 having a rectangular prism shape that fits into the hollow part of the cover retaining member 21.

A light emitting part 4 and a light receiving part 5 as a detection part are mounted on one end surface of the detection part retaining member 22, particularly on a surface (that is, a surface at the cover part 3 side) 22A which does not face the inner circumferential surface of the cover retaining member 21. The light emitting part 4 may be constituted by, for example, a semiconductor element such as a laser diode, but another configuration that emits certain light may be adopted. Also, the light receiving part 5 may be constituted by, for example, a semiconductor element such as a photo diode, but another configuration that detects the above-described light may be adopted.

It is noted that in the following description, a right-handed coordinate system is used, in which a +X direction is a direction of a normal line to the end surface 22A, and a +Z direction is a direction of an edge along a direction running from the mounting position of the light emitting part 4 toward the mounting position of the light receiving part 5, among edges (that is, ridges) of the body part 2.

However, these directions are directions merely defined for convenience in order to simply describe a relative positional relationship of parts constituting the radar apparatus 1. An actual direction in which the radar apparatus 1 is directed in use is optional. For example, when the radar apparatus 1 is mounted, as a radar apparatus for vehicles, on a vehicle, it may be mounted such that the +Z direction faces upward, or the +X direction faces upward. Also, the radar apparatus 1 may be mounted on a vehicle in other postures.

The cover part 3 is constituted by, for example, a transparent resin having light transmittance. The cover part 3 includes, as illustrated in FIG. 1, a light transmitting part 3A having a halved cylindrical shape (that is, a half cylindrical shape) and a base part 3B having a tubular shape with a rectangular cross section (that is, a rectangular tube shape).

The base part 3B viewed from the ±X direction has a rectangular frame shape. The outer circumferential surfaces at the ±Y side and the ±Z side of the base part 3B have a size that connects to the outer circumferential surfaces at the ±Y side and the ±Z side of the cover retaining member 21. The inner circumferential surfaces of the base part 3B have a size that does not interfere with either the optical path of the light emitted by the light emitting part 4 or the optical path of the light to be received by the light receiving part 5. Also, the inner circumferential surfaces of the base part 3B have a size that connects to the inner circumferential surfaces of the cover retaining member 21.

The light transmitting part 3A is constituted in a halved cylindrical shape that has the central axis in the ±Z direction and is convex in the +X direction. In particular, the light transmitting part 3A has a semi-circular shape when viewed from the ±Z direction, and has a surface shape curved along the circumferential surface of a cylinder. It is noted that the shape of the light transmitting part 3A may not be a halved cylinder cut along the central axis (that is, a cylinder with a center angle of 180°), and may be a cylinder with a center angle of less than 180°.

End surfaces at the −X side on the ±Y-side ends of the light transmitting part 3A are individually connected to end surfaces at the +X side in the ±Y-side portions of the base part 3B. Also, end surfaces at the +X side in the ±Z-side portions of the base part 3B each extend in an arc shape toward the +X direction so as to contact edges at the ±Z side of the inner circumferential surface (that is, a surface at the −X side) of the light transmitting part 3A.

Also, as illustrated in FIG. 2, a lens 6 that collects the light emitted by the light emitting part 4 is disposed between the light emitting part 4 and the light transmitting part 3A. A lens 7 that collects the light to be received by the light receiving part 5 is disposed between the light receiving part 5 and the light transmitting part 3A. The lens 6 is supported by a support member disposed to the detection part retaining member 22 such that the positional relationship with the light emitting part 4 is defined. Similarly, the lens 7 is supported by a support member disposed to the detection part retaining member 22 such that the positional relationship with the light receiving part 5 is defined. However, these support members are not illustrated in the drawings.

Also, a light shielding member 9 that prevents the light emitted by the light emitting part 4 from entering the light receiving part 5 without passing through the light transmitting part 3A is disposed to the light transmitting part 3A in such a manner as to project toward the inner circumferential side (that is, the −X side). The light shielding member 9 has a plate-like shape in which the size in the ±Z direction is smaller than the size in the ±X direction and the size in the ±Y direction, and projects from the inner circumferential side of the light transmitting part 3A in such a manner as to approach as close as possible to a space between the light emitting part 4 and the light receiving part 5, as illustrated in FIG. 2.

Light L1 emitted by the light emitting part 4 is reflected by an observation object 99 to become reflected light L2. The light receiving part 5 receives the reflected light L2 via the light transmitting part 3A and the lens 7. At this time, a part of the light L1 is reflected by the inner circumferential surface (that is, a surface at the −X side) of the light transmitting part 3A, like light L3. Also, another part of the light L1 is reflected by the outer circumferential surface (that is, a surface at the +X side) of the light transmitting part 3A, like light L4. The light shielding member 9 is constituted by a material having no light transmittance and prevents the lights L3, L4, and others from entering the light receiving part 5.

Figure 3:
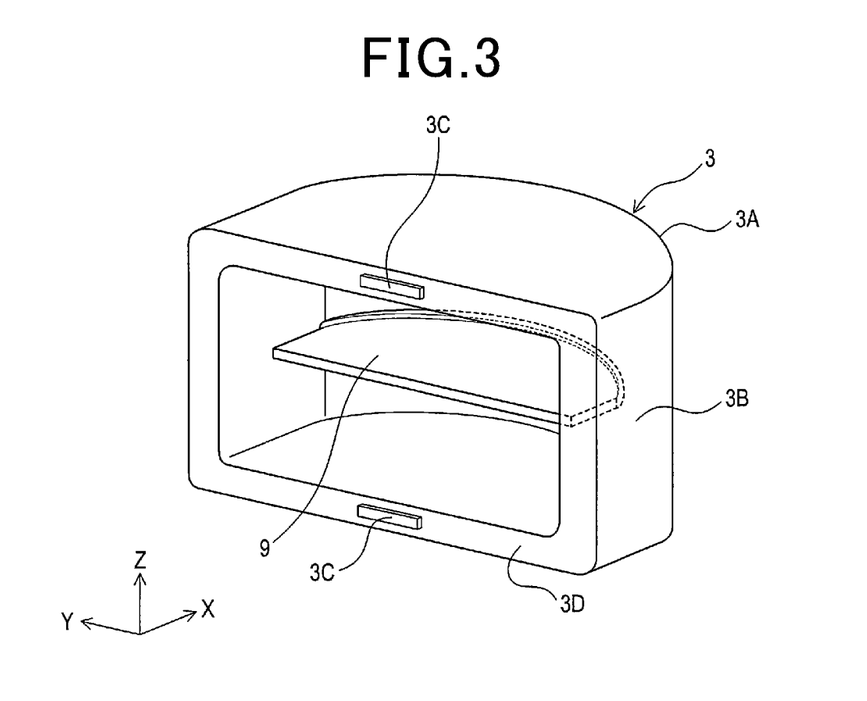
FIG. 3 is a perspective view illustrating a configuration of a cover part according to the first embodiment.

As illustrated in FIG. 1 and FIG. 3, the end surface at the +X side in the light shielding member 9 is disposed on the same cylindrical surface as the outer circumferential surface of the light transmitting part 3A. Also, the end surface on the ±Y side of the light shielding member 9 is formed in a straight line disposed with a gap from the inner circumferential surface in the ±Y direction of the base part 3B, and project from the inner circumferential surface of the light transmitting part 3A toward the −X direction. The end surface at the −X side in the light shielding member 9 is linearly constituted in such a manner as to connect the −X-side ends of the end surfaces at the ±Y side in the light shielding member 9.

Here, the cover part 3 is formed by injection molding. As illustrated in FIG. 3, the number of gate marks 3C formed to the cover part 3 during the injection molding is two. These gate marks 3C are individually disposed to the center portions of edges on the ±Z sides (that is, the centers in the ±Y direction) on an end surface 3D at the −X side of the base part 3B.

1-2. Production Method of Radar Apparatus 1

Hereinafter, a production method of the radar apparatus 1 will be described mainly regarding an injection molding method of the cover retaining member 21 and the cover part 3.

First, the light shielding member 9 is produced independently from other portions in the cover part 3 and the cover retaining member 21. The light shielding member 9 may be produced by injection molding a resin having no light transmittance, by molding the resin through a method other than injection molding, or by another material such as wood or ceramic.

Figure 4:
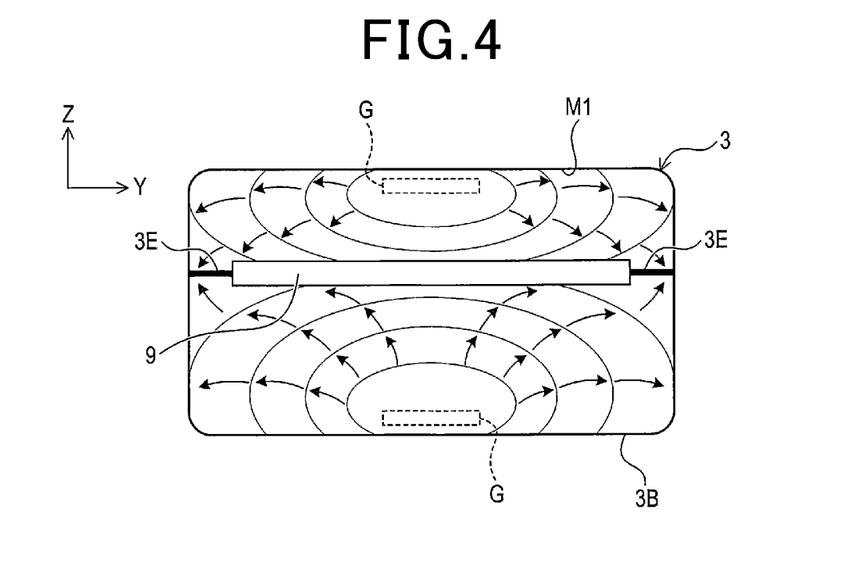
FIG. 4 is a schematic view illustrating a flow of resin during production of the cover part according to the first embodiment.

Subsequently, as illustrated in FIG. 4, the light shielding member 9 is placed in a prescribed mold (hereinafter, a first mold M1) that corresponds to the shape of the cover part 3, and a resin (hereinafter, a first resin) to constitute the light transmitting part 3A and the base part 3B is injected in the first mold M1. Here, the first resin is a resin having light transmittance as described above.

This first resin is molded as the light transmitting part 3A and the base part 3B by insert molding (that is, an example of injection molding) with the light shielding member 9 as an insert component. A highly sophisticated technique is required for molding the entirety of the cover part 3 including the light shielding member 9 by one injection molding. Therefore, in the present embodiment, the light shielding member 9 is previously molded, and then the light transmitting part 3A and the base part 3B are molded by insert molding so as to integrate with the light shielding member 9.

Also, at this time, two gates G through which the first resin is injected into the first mold M1 are individually disposed, as illustrated in FIG. 4, in positions corresponding to the gate marks 3C, that is, in positions corresponding to the centers in the ±Y direction at the ±Z-side edges of the base part 3B. When the first resin is injected into the first mold M1 through these two gates G, the first resin flows as indicated by arrows in FIG. 4. The injection speeds of the resins through the two gates G can be individually adjusted in an appropriate manner such that weld lines 3E created as a result of the resins injected through the two gates G joining together individually extend toward the ±Y direction at both sides in the ±Y direction of the light shielding member 9.

Figure 5:
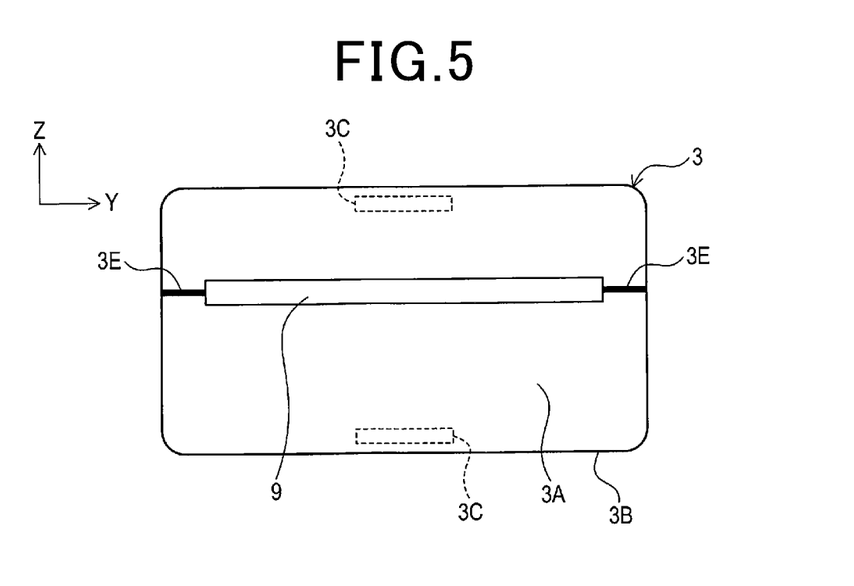
FIG. 5 is a schematic view illustrating positions of weld lines in the cover part according to the first embodiment.

After the cover part 3 molded in this manner has been cooled and solidified, it is removed from the first mold M1 to obtain a cover part 3 illustrated in FIG. 5. This cover part 3 has weld lines 3E, which are individually linearly extend toward the ±Y direction, at both sides in the ±Y direction of the light shielding member 9, and also has the gate marks 3C in the center portions of edges at the ±Z side on the end surface 3D at the −X side of the base part 3B.

Figure 6:
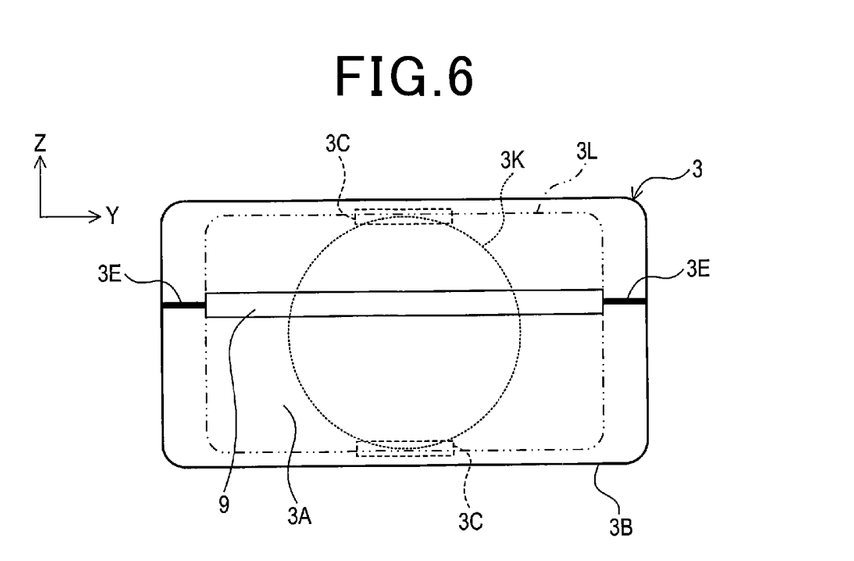
FIG. 6 is a schematic view illustrating a positional relationship between the weld lines and the main part of the cover part according to the first embodiment.

While the radar apparatus 1 is mounted on a vehicle and while the radar apparatus 1 is used, greater stress occurs at a position in the cover part 3 indicated by 3K in FIG. 6, that is, to the circular range in the center of the light transmitting part 3A, compared to other positions in the cover part 3. Also, a position in the cover part 3 indicated by 3L in FIG. 6, that is, the rectangular range excluding the vicinity of the outer circumferential portion of the light transmitting portion 3A, is a position which is to be exposed to outside a vehicle or inside a vehicle interior and subjected to outside light and is required to have design features compared to other positions in the cover part 3.

The weld lines 3E are disposed in positions that avoid a position in the cover part 3 to be added with large stress and a position in the cover part 3 required to have design features. Also, as understood from FIG. 2 and FIG. 5, the weld lines 3E are disposed in positions away from light paths of light L1 emitted by the light emitting part 4 and reflected light L2 corresponding to the light L1.

Subsequently, the cover part 3 is disposed in a prescribed mold (hereinafter, a second mold M2) that corresponds to the shape of the cover retaining member 21, and a resin (hereinafter, a second resin) to constitute the cover retaining member 21 is injected in the second mold M2 through gates GG illustrated in FIG. 2. It is noted that the locations of the gates GG are not limited to the positions illustrated in FIG. 2, and may be other positions. Here, the second resin is a resin having no light transmittance as described above.

This second resin is molded as the cover retaining member 21 by insert molding (that is, an example of injection molding) with the cover part 3 as an insert component. Through the injection molding process, the second resin is bonded to the two gate marks 3C, and the cover retaining member 21 is bonded to the end surface 3D at the −X side in the base part 3B.

After this cover retaining member 21 has been cooled and solidified, the detection part retaining member 22 mounted with the light emitting part 4 and the light receiving part 5 is attached to the hollow portion of the cover retaining member 21 to obtain the radar apparatus 1. It is noted that although the light emitting part 4 and the light receiving part 5 are mounted on a printed circuit board disposed on the end surface 22A of the detection part retaining member 22, the printed circuit board is omitted in FIG. 2. Also, when the detection part retaining member 22 is constituted by a multilayer substrate or the like, the light emitting part 4 and the light receiving part 5 may be directly mounted on the multilayer substrate.

1-3. Effects

According to the above-detailed first embodiment, the following effects are exerted.

(1A) The gate marks 3C in the cover part 3 are disposed on the end surface 3D as a bonding surface to be bonded to the cover retaining member 21 having no light transmittance. Consequently, even when the gate marks 3C are not smoothed, the gate marks 3C can be prevented from influencing the light passing through the cover part 3. For example, even when the light propagating in the cover part 3 reaches the gate marks 3C which are not completely smoothed, the gate marks 3C are bonded to the cover retaining member 21. Consequently, the light reflected by the gate mark 3C is sometimes blocked by the cover retaining member 21 even if it would otherwise emerge from the cover part 3. Therefore, even when the gate marks 3C are not smoothed, reduction in optical properties of the cover part 3 can be suppressed.

(1B) The cover retaining member 21 is molded by injecting the second resin into the second mold M2 such that the second resin is bonded to the gate marks 3C in the cover part 3. This sometimes causes the gate marks 3C to melt and disappear during molding of the cover retaining member 21, which can further favorably suppress the reduction in optical properties of the cover part 3. Also, even when the gate marks 3C do not melt during molding of the cover retaining member 21, the surroundings of the gate marks 3C can be favorably covered by a resin constituting the cover retaining member 21, which can favorably suppress the reduction in optical properties of the cover part 3.

(1C) As illustrated in FIG. 2 and FIG. 5, the weld lines 3E are disposed in positions that avoid the light paths of light L1 emitted by the light emitting part 4 and reflected light L2 corresponding to the light L1. That is, the weld lines 3E are disposed in such a manner as to avoid positions where lights associated with the light emitting part 4 and the light receiving part 5 pass through the cover part 3. Consequently, the weld lines 3E are prevented from influencing the observation of the observation object 99 by the radar apparatus 1.

(1D) As illustrated in FIG. 6, the weld lines 3E are disposed in positions that avoid a position (that is, a position indicated by 3K) in the cover part 3 where greater stress occurs. Consequently, the weld lines 3E are prevented from influencing the strength and durability of the cover part 3.

(1E) The weld lines 3E are disposed in position that avoid a position (that is, a position indicated by 3L) in the cover part 3 where design features are required. Consequently, the weld lines 3E are prevented from influencing the design features of the cover part 3.

(1F) The cover part 3 includes a plurality of the gate marks 3C. That is, the cover part 3 is molded by injecting the first resin into the first mold M1 through a plurality of the gates G. Consequently, the weld lines 3E can be also stably disposed, during molding of the cover part 3, in positions where the effects (1C) to (1E) are exerted.

(1G) Also, the first resin is molded such that the cover part 3 integrates with the light shielding member 9, as an insert component, molded independently from the light transmitting part 3A and the base part 3B. Consequently, the control of the flow of the first resin during molding of the cover part 3 is facilitated, and the weld lines 3E can be further stably disposed in positions where the effects (1C) to (1E) are exerted.

2. Second Embodiment 2-1. Differences from First Embodiment

Since the fundamental configuration of a second embodiment is similar to that in the first embodiment, differences will be described below. It is noted that the same reference numerals as those in the first embodiment indicates the same configuration, and the previous description should be referred to.

Figure 7:
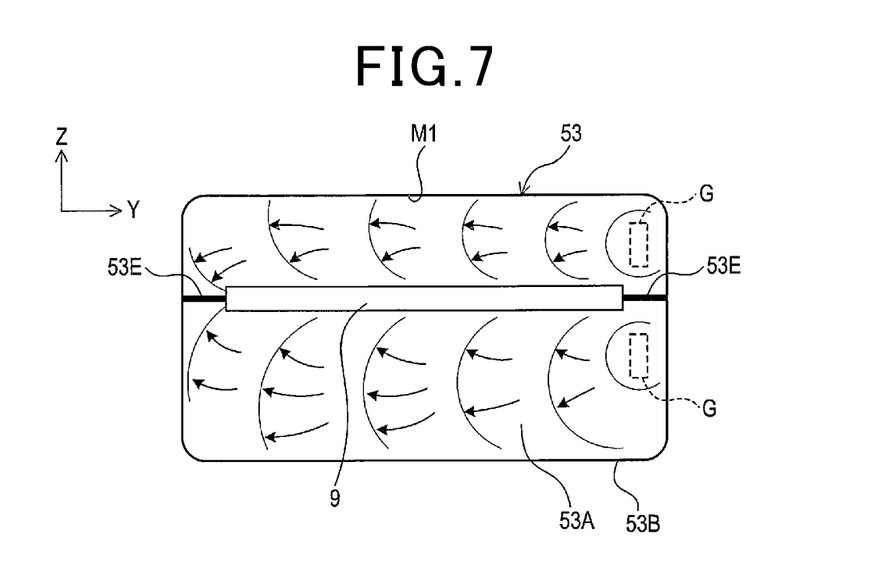
FIG. 7 is a schematic view illustrating a flow of resin during production of a cover part according to a second embodiment.

The cover part 3 in the first embodiment was molded by injecting the first resin through two gates G disposed in positions corresponding to the centers in the ±Y direction at the ±Z-side edges of the base part 3B. On the other hand, as illustrated in FIG. 7, a cover part 53 in the second embodiment differs in that it is molded by injecting the first resin through two gates G disposed in positions corresponding to the +Y-side edge of a base part 53B in such a manner as to be spaced apart in the ±Z direction. More specifically, the two gates G are disposed such that an XY plane passing through the light shielding member 9 is sandwiched between the gates G from the ±Z direction. When such a first mold M1 is used to mold the cover part 53, the first resin flows as indicated by arrows in FIG. 7.

In this case, the injection speeds of the resins through the two gates G can also be individually adjusted in an appropriate manner such that weld lines 53E created as a result of the resins injected through the two gates G joining together individually extend toward the ±Y direction at both sides in the ±Y direction of the light shielding member 9.

Figure 8:
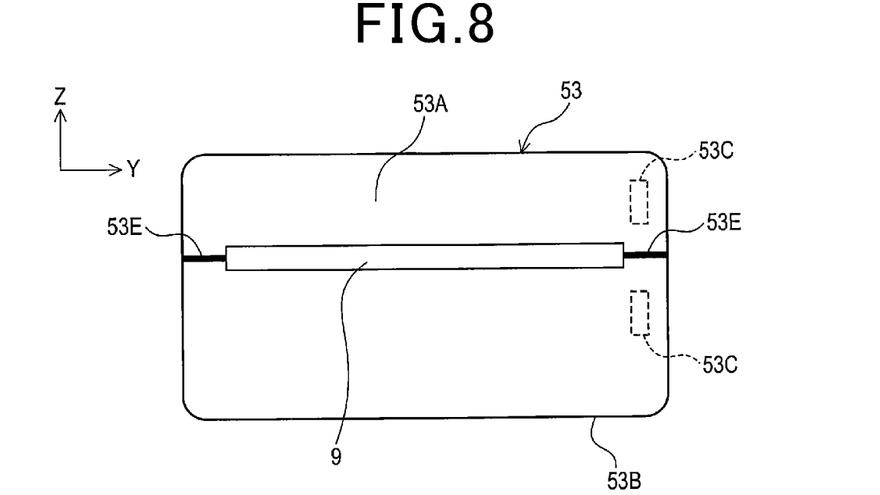
FIG. 8 is a schematic view illustrating positions of weld lines in the cover part according to the second embodiment.

After the cover part 53 molded in this manner has been cooled and solidified, it is removed from the first mold M1 to obtain a cover part 53 illustrated in FIG. 8. This cover part 53 has weld lines 53E, which individually linearly extend in the ±Y direction, at both sides in the ±Y direction of the light shielding member 9, and also has two gate marks 53C spaced apart in the ±Z directions at the +Y-side edge on the −X-side end surface in the base part 53B.

2-2. Effects

Therefore, effects similar to the above-described (1A) to (1G) in the first embodiment are also exerted in the second embodiment including the cover part 53 in place of the cover part 3 in the first embodiment.

3. Third Embodiment 3-1. Differences from First Embodiment

Since the fundamental configuration of a third embodiment is similar to that in the first embodiment, differences will be described below. It is noted that the same reference numerals as those in the first embodiment indicates the same configuration, and the previous description should be referred to.

Figure 9:
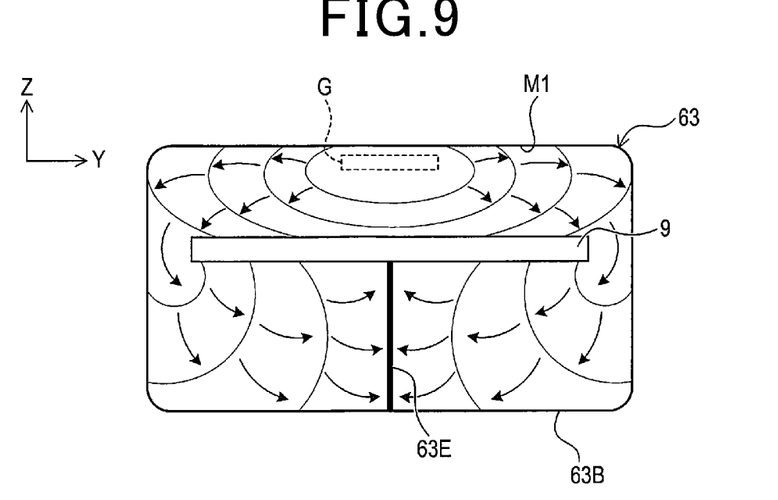
FIG. 9 is a schematic view illustrating a flow of resin during production of a cover part according to a third embodiment.

The cover part 3 in the first embodiment was molded by injecting the first resin through two gates G disposed in positions corresponding to the centers in the ±Y direction at the ±Z-side edges of the base part 3B. On the other hand, as illustrated in FIG. 9, a cover part 63 in the third embodiment differs in that it is molded by injecting the first resin through a gate G disposed in a position corresponding to the center in the ±Y direction at the +Z-side edge of a base part 63B. When such a first mold M1 is used to mold the cover part 63, the first resin flows as indicated by arrows in FIG. 9.

Figure 10:
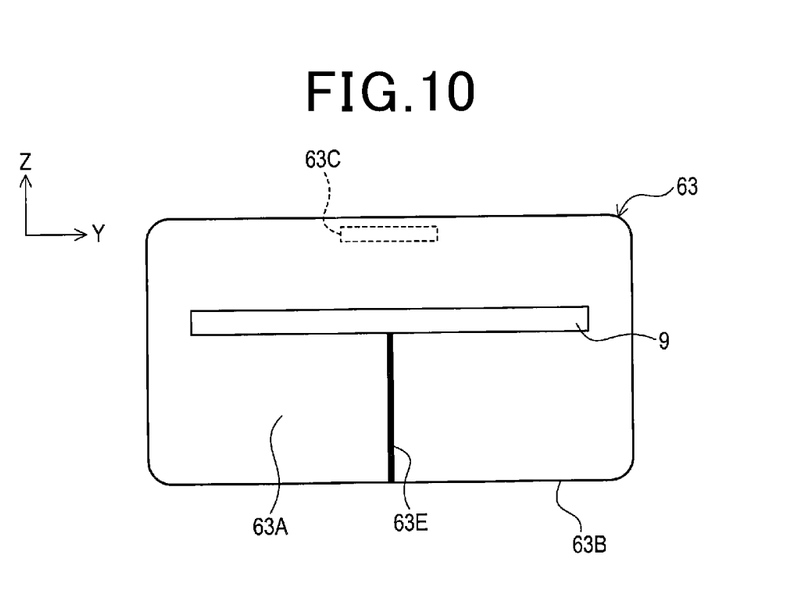
FIG. 10 is a schematic view illustrating a position of a weld line in the cover part according to the third embodiment.

In this case, a weld line 63E created as a result of the resin injected through the gate G joining together is formed in such a manner as to extend in the −Z direction from the center in the ±Y direction on the −Z-side surface of the light shielding member 9. After the cover part 63 molded in this manner has been cooled and solidified, it is removed from the first mold M1 to obtain a cover part 63 illustrated in FIG. 10. This cover part 63 has a linear weld line 63E that extends in the −Z direction from the center in the ±Y direction on the −Z-side surface of the light shielding member 9, and also has a gate mark 63C at the center in the ±Y direction of the +Z-side edge on the −X-side end surface in the base part 63B.

3-2. Effects

Therefore, effects similar to the above-described (1A) and (1B) in the first embodiment are exerted in the third embodiment including the cover part 63 in place of the cover part 3 in the first embodiment.

4. Fourth Embodiment 4-1. Differences from First Embodiment

Since the fundamental configuration of a fourth embodiment is similar to that in the first embodiment, differences will be described below. It is noted that the same reference numerals as those in the first embodiment indicates the same configuration, and the previous description should be referred to.

Figure 11:
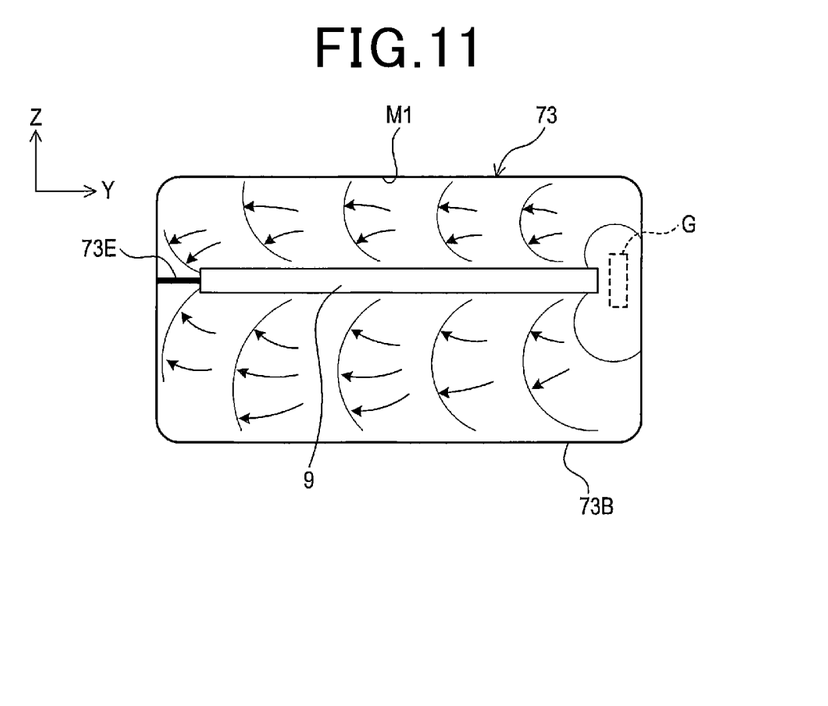
FIG. 11 is a schematic view illustrating a flow of resin during production of a cover part according to a fourth embodiment.

The cover part 3 in the first embodiment was molded by injecting the first resin through two gates G disposed in positions corresponding to the centers in the ±Y direction at the ±Z-side edges of the base part 3B. On the other hand, as illustrated in FIG. 11, a cover part 73 in the fourth embodiment differs in that it is molded by injecting the first resin through one gate G disposed in a position corresponding to the +Y-side edge of a base part 73B. When such a first mold M1 is used to mold the cover part 73, the first resin flows as indicated by arrows in FIG. 11.

Figure 12:
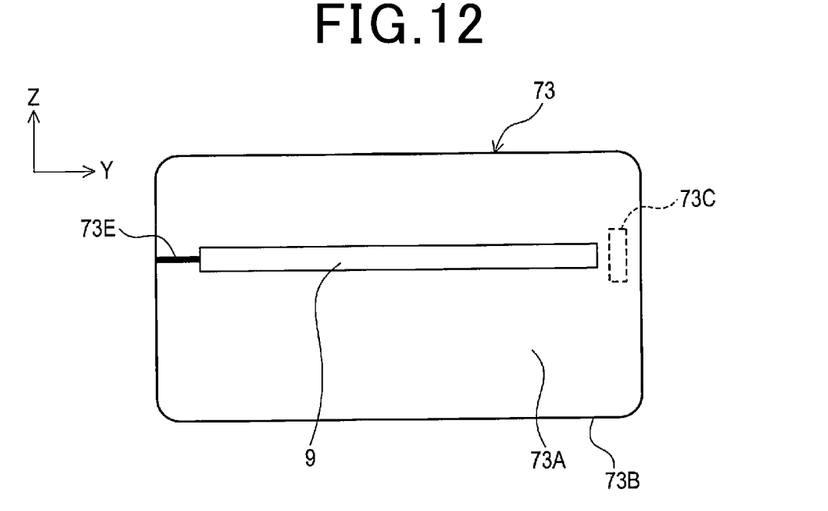
FIG. 12 is a schematic view illustrating a position of a weld line in the cover part according to the fourth embodiment.

In this case, a weld line 73E created as a result of the resins injected through the gate G joining together is formed in such a manner as to extend in the −Y direction at the −Y side of the light shielding member 9. After the cover part 73 molded in this manner has been cooled and solidified, it is removed from the first mold M1 to obtain a cover part 73 illustrated in FIG. 12. This cover part 73 has a linear weld line 73E that extends in the −Y direction from the −Y side of the light shielding member 9, and also has a gate mark 73C at the center in the ±Z direction of the +Y-side edge on the −X-side end surface in the base part 73B.

4-2. Effects

Therefore, effects similar to above-described (1A) to (1E) in the first embodiment are exerted in the fourth embodiment including the cover part 73 in place of the cover part 3 in the first embodiment.

5. Correspondence Relation of Terms

In the relation between each of the above-described embodiments and the present disclosure, the cover retaining member 21 corresponds to the second molded body and another member. The end surface 3D corresponds to the bonding surface. The cover part 3, the cover part 53, the cover part 63, or the cover part 73 corresponds to the first molded body. The weld line 3E, the weld line 53E, the weld line 63E, or the weld line 73E corresponds to the weld part. The injection molding process using the first mold M1 corresponds to the first process. The injection molding process using the second mold M2 corresponds to the second process. The gate G corresponds to the first gate. The gate GG corresponds to the second gate.

It is noted that in the present disclosure, the weld part is a portion in the molded body where the resins melted during molding join together. An example of this weld part may be a weld line that is a linear concave portion created as a result of the melted resins linearly joined together.

6. Other Embodiments

Although embodiments of the present disclosure have been described above, the present disclosure is not limited to the above-described embodiments, which can be variously modified for implementation.

(6A) In the above-described embodiments, the cover part 3 or the like was placed in the second mold M2, and the second resin was injected into the second mold M2 to mold the cover retaining member 21. However, the present disclosure is not limited to this. For example, the cover retaining member 21 may be molded independently from the cover part 3 or the like and then bonded to the end surface 3D or the like by adhesion or other methods after the second resin has been solidified. Also, instead of bonding the cover retaining member 21 to the end surface 3D without a space therebetween, a space between the cover retaining member 21 and the end surface 3D may be bridged with a seal material or the like. In such a case, effects similar to the above-described embodiments are also exerted, because the gate mark 3C or the like is disposed to a portion hidden by the seal material.

(6B) In the first embodiment and the second embodiment, the injection speeds of the resins through the two gates G were individually adjusted in an appropriate manner as a method for adjusting the positions of the weld lines 3E. However, the present disclosure is not limited to this. An example of the method may include individually adjusting the injection pressures of the resins through the two gates G in an appropriate manner or disposing, to an appropriate position in the mold, an air hole for releasing the air in the mold. Also, the number of gates G may be three or more. For example, the two gates G in the first embodiment may be individually divided into two such that four gates G are disposed. Also, the sizes of the multiple gates G may be varied such that the positions of the weld lines 3E are adjusted taking advantage of the fact that more resin flows from a larger gate G.

(6C) In the above-described embodiments, the cover part 3 was molded by insert molding with the light shielding member 9 as an insert component. However, the present disclosure is not limited to this. For example, the entirety of the cover part 3 including the light shielding member 9 may be molded by one injection molding. However, when an insert component is used, the control of the flow of the first resin during molding of the cover part 3 is easier in some cases.

(6D) In the above-described embodiments, the present disclosure was applied for the cover part in the radar apparatus 1 for vehicles. However, the present disclosure is not limited to this. For example, the radar apparatus 1 may be a radar apparatus other than a radar apparatus for vehicles, and the cover part 3 may be a cover part in another optical device such as an optical sensor.

(6E) A plurality of functions provided by one constituent in each of the above-described embodiments may be achieved by a plurality of constituents, or one function provided by one constituent may be achieved by a plurality of constituents. Also, a plurality of functions provided by a plurality of constituents may be achieved by one constituent, or one function provided by a plurality of constituents may be achieved by one constituent. Also, the configuration of each of the above-described embodiments may be partly omitted. Also, at least a part of the configuration of each of the above-described embodiments may be added to or replace the configuration of another embodiment.

What is claimed is:

1. A molded body obtained by molding a resin and used by allowing light to pass through the resin, wherein
a gate mark that is a mark of a gate through which the resin was injected during the molding is disposed on a bonding surface in the molded body to be bonded to another member having no light transmittance, and
the molded body is a cover having a space in an interior and is joined to the other member at the bonding surface, the molded body and the other member being shaped and bonded such that the other member is fully located behind the molded body with respect to the bonding surface.

2. The molded body according to claim 1,
wherein the molded body is defined as a first molded body, and the other member is a second molded body obtained by molding resin so as to integrate with the first molded body.

3. The molded body according to claim 1, which
comprises a plurality of the gate marks, and
further comprises a weld part disposed in such a manner as to avoid a position through which the light passes.

4. The molded body according to claim 2, which
comprises a plurality of the gate marks, and
further comprises a weld part disposed in such a manner as to avoid a position through which the light passes.

5. The molded body according to claim 3, wherein
a light shielding member having no light transmittance is disposed along the weld part.

6. The molded body according to claim 4, wherein
a light shielding member having no light transmittance is disposed along the weld part 1.

* * * * *